(12) United States Patent
Tsuchida (10) Patent No.: US 10,992,213 B2
(45) Date of Patent: Apr. 27, 2021

(54) MOTOR OF COMPRESSOR AND REFRIGERATION CYCLE APPARATUS

(71) Applicant: Mitsubishi Electric Corporation, Tokyo (JP)

(72) Inventor: Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 620 days.

(21) Appl. No.: 15/500,609

(22) PCT Filed: Aug. 29, 2014

(86) PCT No.: PCT/JP2014/072755
§ 371 (c)(1),
(2) Date: Jan. 31, 2017

(87) PCT Pub. No.: WO2016/031054
PCT Pub. Date: Mar. 3, 2016

(65) Prior Publication Data
US 2017/0222528 A1     Aug. 3, 2017

(51) Int. Cl.
*H02K 21/16*     (2006.01)
*F25B 1/04*     (2006.01)
(Continued)

(52) U.S. Cl.
CPC ............... *H02K 21/16* (2013.01); *F25B 1/04* (2013.01); *F25B 31/026* (2013.01); *H02K 1/146* (2013.01);
(Continued)

(58) Field of Classification Search
CPC ........ H02K 21/16; H02K 1/146; H02K 1/276; H02K 3/02; H02K 2213/03
(Continued)

(56) References Cited

U.S. PATENT DOCUMENTS 5,684,352 A   11/1997   Mita et al.
5,808,392 A   9/1998   Sakai et al.
(Continued)

FOREIGN PATENT DOCUMENTS

CN   103795168 A   5/2014
CN   203747527 U   7/2014
(Continued)

OTHER PUBLICATIONS

Machine translation of JP-2008263663-A. (Year: 2008).*
(Continued)

*Primary Examiner* — Michael Andrews
(74) *Attorney, Agent, or Firm* — Posz Law Group, PLC (57) ABSTRACT

A compressor includes: a stator core including a plurality of teeth around which an aluminum winding wire is wound in a concentrated manner; a rotor core disposed on an inner diameter side of the stator core and including a plurality of magnet insertion holes; and a plurality of ferrite magnets inserted in the magnet insertion holes, in which when a width of a winding wire portion formed in each of the teeth is represented as A, a length in an axis direction of the stator core is represented as L, and the number of slots is represented as S, the stator core has a shape that satisfies a relation of $0.3 < S \times A \div L < 2.2$.

7 Claims, 9 Drawing Sheets (51) Int. Cl.
    *F25B 31/02* (2006.01)
    *H02K 1/14* (2006.01)
    *H02K 1/27* (2006.01)
    *H02K 3/02* (2006.01)
    *F25B 31/00* (2006.01)
    *F25B 49/02* (2006.01)
    *F25B 41/385* (2021.01)

(52) U.S. Cl.
    CPC ............... *H02K 1/276* (2013.01); *H02K 3/02* (2013.01); *F25B 31/008* (2013.01); *F25B 41/385* (2021.01); *F25B 49/02* (2013.01); *F25B 2400/0409* (2013.01); *F25B 2600/2501* (2013.01); *F25B 2600/2515* (2013.01); *F25B 2700/21152* (2013.01); *H02K 2213/03* (2013.01)

(58) Field of Classification Search
    USPC .................................................. 310/216.069
    See application file for complete search history.

(56) References Cited

U.S. PATENT DOCUMENTS

| | | | |
|---|---|---|---|
| 6,984,909 B2 | 1/2006 | Kadoya et al. | |
| 2009/0195109 A1* | 8/2009 | Horst | H02K 1/16 310/216.004 |
| 2012/0159983 A1* | 6/2012 | Tsutsumi | H02K 1/14 62/498 |
| 2013/0084202 A1* | 4/2013 | Takahashi | F04C 23/008 418/209 |
| 2013/0106228 A1* | 5/2013 | Aoyama | H02K 29/03 310/156.53 |
| 2014/0103770 A1 | 4/2014 | Brahmavar | |
| 2015/0200570 A1 | 7/2015 | Tsuchida et al. | |
| 2015/0372547 A1 | 12/2015 | Kifuji et al. | |
| 2015/0372548 A1 | 12/2015 | Nigo et al. | |

FOREIGN PATENT DOCUMENTS

| | | |
|---|---|---|
| EP | 1 257 038 A1 | 11/2002 |
| JP | 07-322539 A | 12/1995 |
| JP | 07-336917 A | 12/1995 |
| JP | 08/331784 A | 12/1996 |
| JP | 2001-037186 A | 2/2001 |
| JP | 2001-115963 A | 4/2001 |
| JP | 2001-218436 A | 8/2001 |
| JP | 2003134712 A | 5/2003 |
| JP | 2003224938 A | 8/2003 |
| JP | 2004-215479 A | 7/2004 |
| JP | 2005-245148 A | 9/2005 |
| JP | 2008-263663 A | 10/2008 |
| JP | 2008263663 A * | 10/2008 |
| JP | 2010-246229 A | 10/2010 |
| JP | 2011-511614 A | 4/2011 |
| JP | 2011-135753 A | 7/2011 |
| JP | 2012139087 A | 7/2012 |
| JP | 2012-222891 A | 11/2012 |
| WO | 2014013598 A1 | 1/2014 |
| WO | 2014050154 A1 | 4/2014 |
| WO | 2014/102950 A1 | 7/2014 |

OTHER PUBLICATIONS

Office Action dated Sep. 12, 2017 in corresponding JP patent application No. 2016-545197 (and English machine translation attached).

Office Action corresponding to Chinese Patent Application No. 201480081473.7 dated May 28, 2018 with English translation.

International Search Report of the International Searching Authority dated Nov. 18, 2014 for the corresponding international application No. PCT/JP2014/072755 (and English translation).

* cited by examiner

MOTOR OF COMPRESSOR AND REFRIGERATION CYCLE APPARATUS

CROSS REFERENCE TO RELATED APPLICATION

This application is a U.S. national stage application of International Patent Application No. PCT/JP2014/072755 filed on Aug. 29, 2014, the disclosure of which is incorporated herein by reference.

TECHNICAL FIELD

The present invention relates to a motor of a compressor that, while converting a refrigerant subjected to a low temperature and a low pressure into a refrigerant subjected to a high temperature and a high pressure, and circulates the resultant refrigerant, and a refrigeration cycle apparatus including the compressor.

BACKGROUND

A conventional motor disclosed in Patent Literature 1 listed below has a configuration in which a cylindrical permanent magnet is disposed on an outer circumference of a rotor core and a magnetic tube made of stainless steel is further disposed on an outer circumference of the permanent magnet to prevent significant demagnetization of the permanent magnet due to a high temperature. Magnetic resistance of a magnetic circuit viewed from the permanent magnet is reduced by the magnetic tube provided between the permanent magnet and a stator, a residual magnetic flux density at an operating point of the permanent magnet at the time of armature reaction increases, and a magnetic flux reaching a stator core from the permanent magnet increases. Therefore, the conventional motor disclosed in Patent Literature 1 listed below can prevent demagnetization of the permanent magnet and prevent a reduction of its output even when the permanent magnet has a high temperature and armature reaction is exerted.

PATENT LITERATURE

Patent Literature 1: Japanese Patent Application Laid-open No. H7-322539

However, because a magnetic permeability of stainless steel constituting the magnetic tube is lower than a magnetic permeability of silicon steel or Armco ion used for the rotor core and the stator core, the configuration taught by Patent Literature 1 is unsuitable for improving the motor efficiency. On the other hand, in a compressor, during one revolution of a rotor, a compression torque varies according to a rotational position of the motor, and the maximum value of the compression torque may be three times an average torque depending on an operation condition. In a motor of a compressor, demagnetization of a rotor magnet depends on a peak current flowing at the time of the maximum compression torque. Therefore, a motor of a compressor needs to conform to a specification with demagnetization resistance considered more significantly than a motor represented by Patent Literature 1 mentioned above, that is, a motor used for a mechanism including no load change.

SUMMARY

The present invention has been achieved in view of the above circumstances, and an object of the present invention is to provide a motor for a compressor that can improve demagnetization resistance while suppressing a reduction in motor efficiency.

In order to solve the above-mentioned problems and achieve the object, the present invention provides a motor of a compressor comprising: a stator core including a plurality of teeth and a plurality of slots formed between the teeth, an aluminum winding wire being wound around the teeth in a concentrated manner; a rotor core disposed on an inner diameter side of the stator core and including a plurality of magnet insertion holes; and a plurality of ferrite magnets inserted into the magnet insertion holes, wherein when a width of a winding wire portion formed in each of the teeth is represented as A, a length in an axis direction of the stator core is represented as L, and the number of the slots is represented as S, the stator core has a shape that satisfies a relation of $0.3 < S \times A \div L < 2.2$.

Advantageous Effects of Invention

According to the present invention, an advantageous effect is yielded in that it is possible to improve demagnetization resistance while suppressing a reduction in motor efficiency.

DETAILED DESCRIPTION

A motor of a compressor and a refrigeration cycle apparatus according to embodiments of the present invention will be described below in detail with reference to the drawings. The present invention is not limited to the embodiments.

First Embodiment

Figure 1:
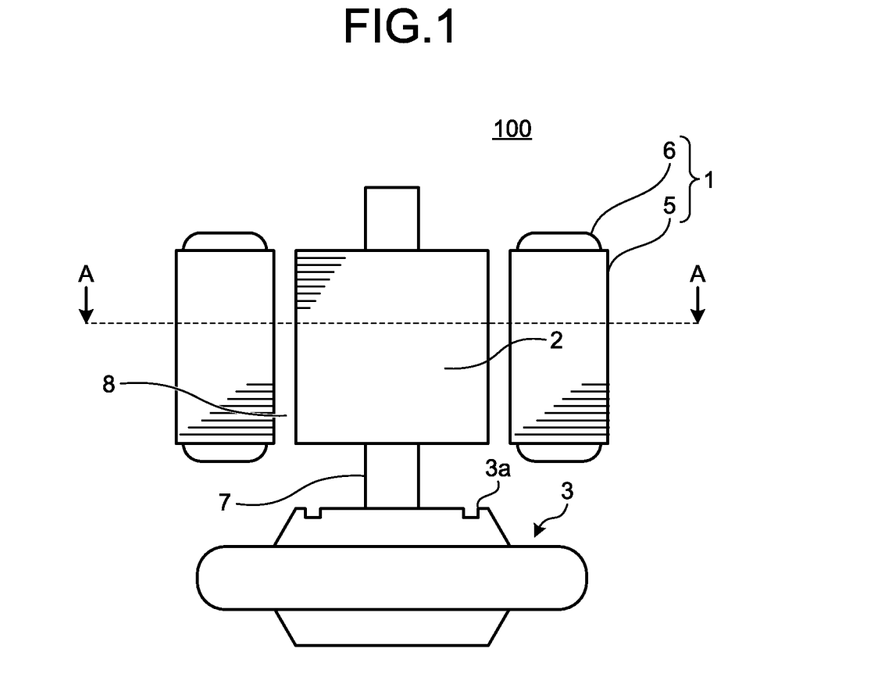
FIG. 1 is a side view of a motor of a compressor according to a first embodiment of the present invention.
Figure 2:
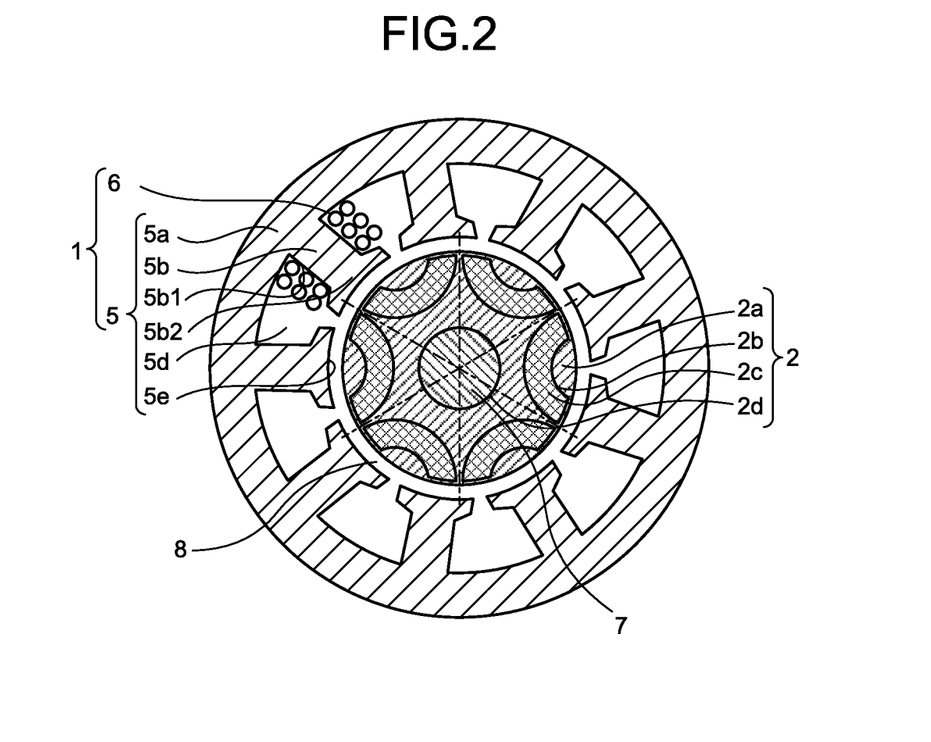
FIG. 2 is a sectional view of a stator and a rotor illustrated in FIG. 1 taken along a line in the direction by arrows A-A.
Figure 3:
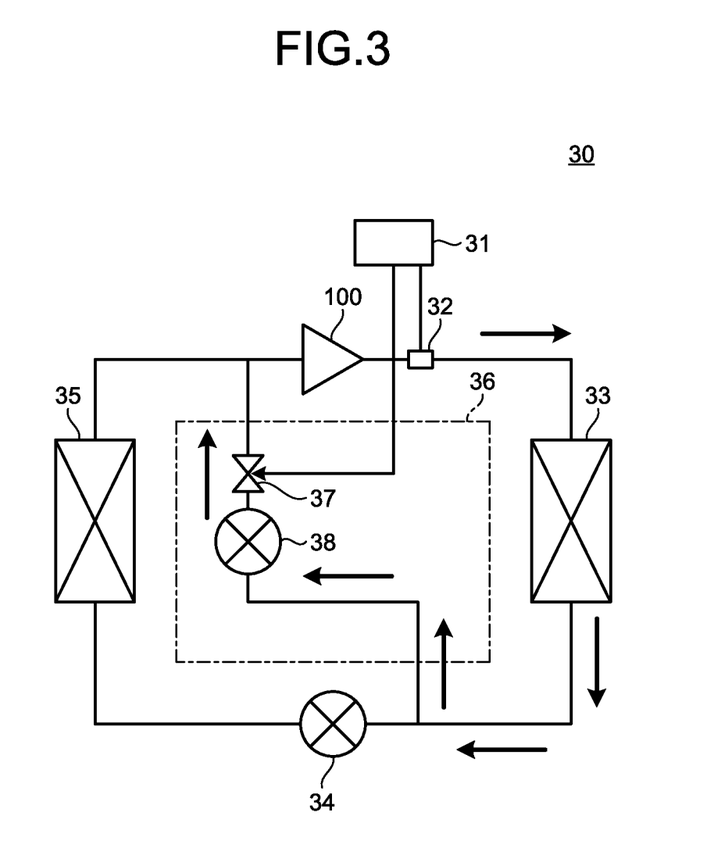
FIG. 3 is a configuration diagram of a refrigeration cycle apparatus having the compressor illustrated in FIG. 1 mounted thereon.

FIG. 1 is a side view of a motor of a compressor according to a first embodiment of the present invention, FIG. 2 is a sectional view of a stator and a rotor illustrated in FIG. 1 taken along a line in the direction by arrows A-A, and FIG. 3 is a configuration diagram of a refrigeration cycle apparatus having the compressor illustrated in FIG. 1 mounted thereon.

A compressor 100 illustrated in FIG. 1 includes a stator 1 disposed on an inner circumferential surface of a frame (not illustrated), a rotor 2 disposed on an inner diameter side of the stator 1 with a clearance 8 located therebetween, and a compression unit 3 to which a shaft 7 penetrating the rotor 2 is connected. Discharge holes 3a for discharging a high-pressure refrigerant compressed by the compression unit 3 are formed on an upper portion of the compression unit 3.

The stator 1 and the rotor 2 constitute a motor of the compressor 100. The stator 1 is fixed to the inner circumferential surface of the frame (not illustrated) by press fitting, shrinkage fitting or freeze fitting. The shaft 7 is held in a state such that the shaft can rotate by bearings (not illustrated) provided on an upper part and a lower part of the compressor 100.

The stator 1 illustrated in FIG. 2 is composed of an annular stator core 5 constructed of a number of electromagnetic steel sheets each having been formed in a specific shape by a stamping process, and having been stacked on top of another in an axis direction, and an aluminum winding wire 6 to which external electric power is supplied.

The stator core 5 has an annular back yoke 5a, and a number of teeth 5b that are arranged on an inner diameter side of the back yoke 5a at regular intervals in a rotation direction and that extend from the back yoke 5a toward a center of the stator core 5.

Each of the teeth 5b has a winding wire portion 5b1 around which the aluminum winding wire 6 is wound, and an umbrella-shaped tooth end portion 5b2 that is formed on an inner diameter side of the corresponding tooth 5b and has a facing surface 5e facing the rotor 2, which extends in the rotation direction.

A number of slots 5d are also formed on the stator core 5, which are spaces delimited by the back yoke 5a, the winding wire portions 5b1 and the tooth end portions 5b2.

In the illustrated example, nine teeth 5b are formed. The width in the rotation direction of the winding wire portion 5b1 is constant from the back yoke 5a to the tooth end portion 5b2. The aluminum winding wire 6 that generates a rotating magnetic field is wound around the winding wire portion 5b1 in a concentrated winding method. In FIG. 2, only the aluminum winding wire 6 that is wound around one winding wire portion 5b1 is illustrated and illustrations of the aluminum winding wire 6 on the other portions are omitted.

The rotor 2 includes a cylindrical rotor core 2a formed by stacking a number of electromagnetic steel sheets each having been formed in a specific shape by a stamping process, and having been stacked on top of another in the axis direction, a number of magnet insertion holes 2b provided at regular intervals in the rotation direction in correspondence with the number of magnetic poles and having a curved shape protruding to a radially inner side, ferrite magnets 2c each having a shape corresponding to the shape of the magnetic insertion hole 2b and inserted into the magnetic insertion holes 2b, respectively, and a shaft insertion hole 2d formed at a center about a radial direction of the rotor core 2a.

The shaft 7 is fixed to the shaft insertion hole 2d by press fitting, shrinkage fitting or freeze fitting. The magnet insertion holes 2b extend in the axis direction, and six ferrite magnets 2c are inserted into the magnet insertion holes 2b, respectively, in the illustrated example.

The clearance 8 is formed between an outer circumferential surface of the rotor 2 and the tooth end portions 5b2. When the aluminum winding wire 6 is subjected to electric conduction, a rotating magnetic field is generated between the rotor 2 and the stator 1, and thereby the rotor 2 is rotated.

A refrigeration cycle apparatus 30 illustrated in FIG. 3 includes the compressor 100 illustrated in FIG. 1, a control circuit 31, a temperature sensor 32, a condenser 33, a decompression device 34, an evaporator 35, a bypass circuit 36, an on-off valve 37, and anther decompression device 38.

The control circuit 31 controls the on-off valve 37 based on a detection result of the temperature sensor 32. The temperature sensor 32 is provided near a gas outlet of the compressor 100 to detect a temperature of a refrigerant flowing through the gas outlet. The bypass circuit 36 constituted by the decompression device 38 and the on-off valve 37 that are connected in series is interposed between a liquid refrigerant outlet of the condenser 33 and a gas inlet of the compressor 100. The refrigeration cycle apparatus 30 is suitable for an air conditioner.

An operation is described below. High-temperature and high-pressure refrigerant gas compressed by the compressor 100 exchanges heat with air and condenses to become a liquid refrigerant in the condenser 33. The liquid refrigerant expands in the decompression device 34 to become low-temperature and low-pressure refrigerant gas. The low-temperature and low-pressure refrigerant gas sucked in the compression unit 3 illustrated in FIG. 1 is compressed in the compression unit 3 based on rotation of the rotor 2 to have a high temperature and a high pressure again. The high-temperature and high-pressure refrigerant gas passes through the clearance 8 between the stator 1 and the rotor 2 or the slots 5d, and is discharged from a discharge pipe (not illustrated) formed on the compressor 100. In this manner, in the refrigeration cycle apparatus 30, the refrigerant circulates through the compressor 100, the condenser 33, the decompression device 34 and the evaporator 35 in this order, and returns again to the compressor 100.

Figure 4:
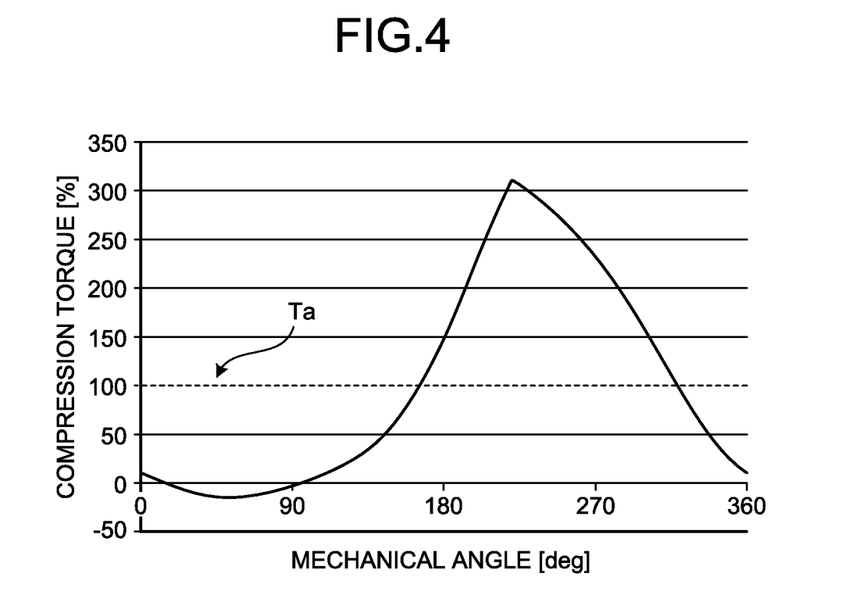
FIG. 4 is a chart illustrating variation in a compression torque of the compressor.

FIG. 4 is a chart illustrating variation in a compression torque of the compressor. Because the compressor 100 performs a compression operation, the compression torque changes while the rotor 2 rotates one revolution as illustrated in FIG. 4. Assuming that an average torque Ta is 100%, the maximum value of the compression torque may reach 300% that is three times the average torque Ta depending on an operation condition.

In the motor used in the compressor 100, demagnetization of a rotor magnet depends on a peak current flowing at the time of the maximum compression torque. Therefore, the motor used in the compressor 100 needs to conform to a specification with demagnetization resistance considered more significantly than a motor used in a mechanism including no load change.

For the motor of the compressor 100 according to the first embodiment, the aluminum winding wire 6 that is a winding wire made of aluminum having a lower electric conductivity than a copper wire used as a generally used winding wire, and the ferrite magnets 2c having a positive temperature coefficient of coercive force are used to improve the demagnetization resistance.

Figure 5:
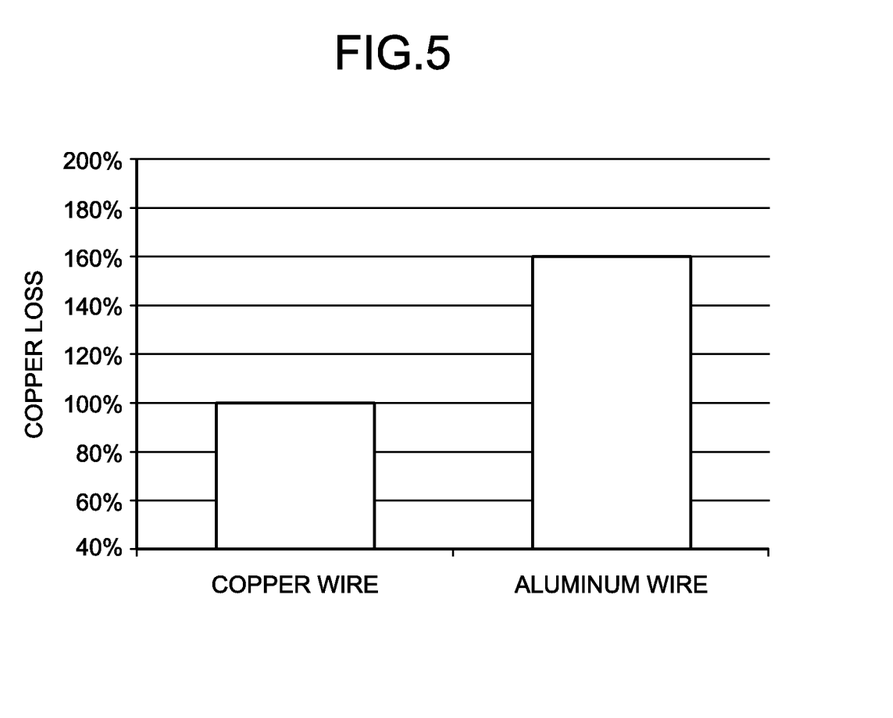
FIG. 5 is a chart illustrating rates of copper losses of a copper wire and an aluminum wire.
Figure 6:
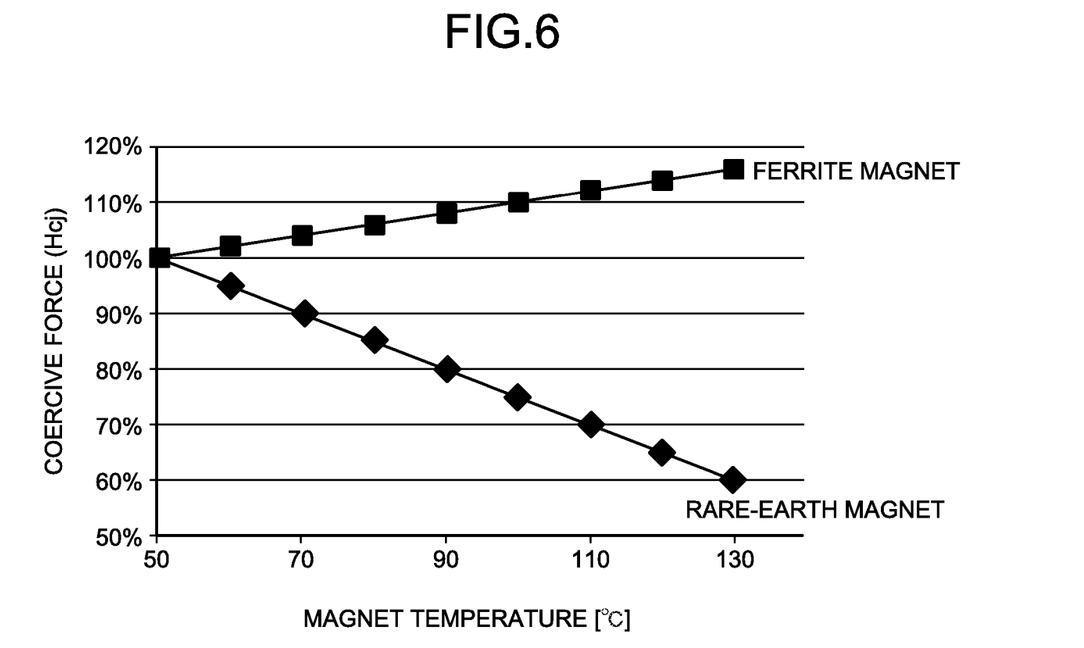
FIG. 6 is a chart illustrating relations between a magnet temperature and a coercive force.
Figure 7:
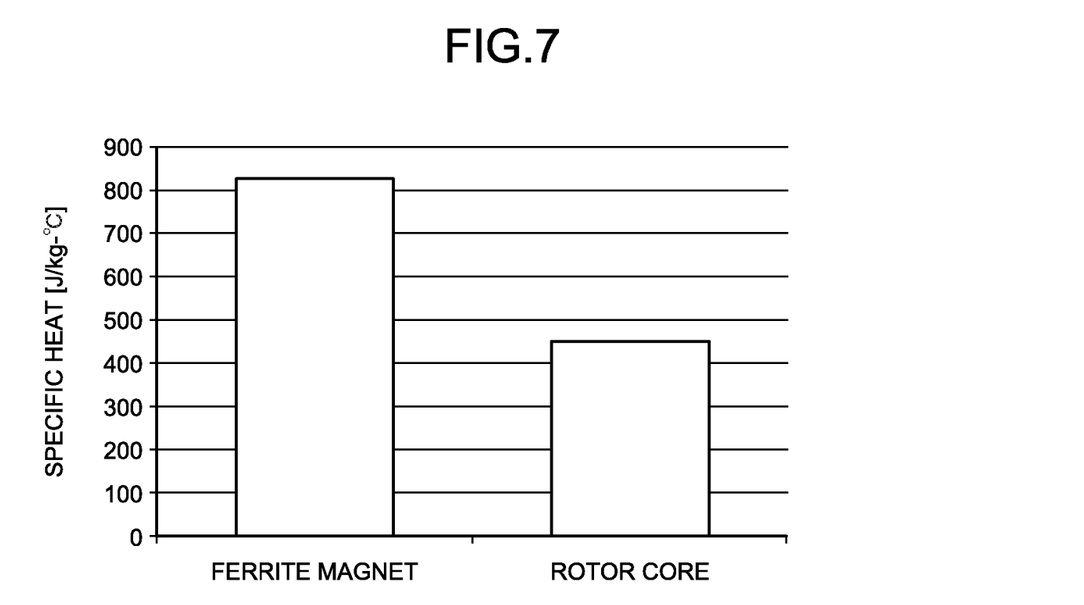
FIG. 7 is a diagram illustrating specific heats of a ferrite magnet and a rotor core.
Figure 8:
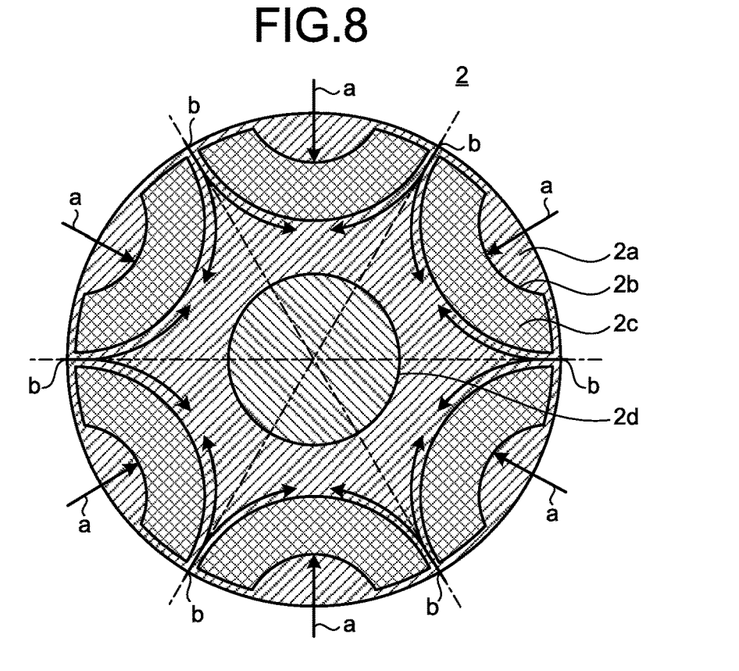
FIG. 8 is an illustration representing heat transmitted to inside of the rotor core.
Figure 9:
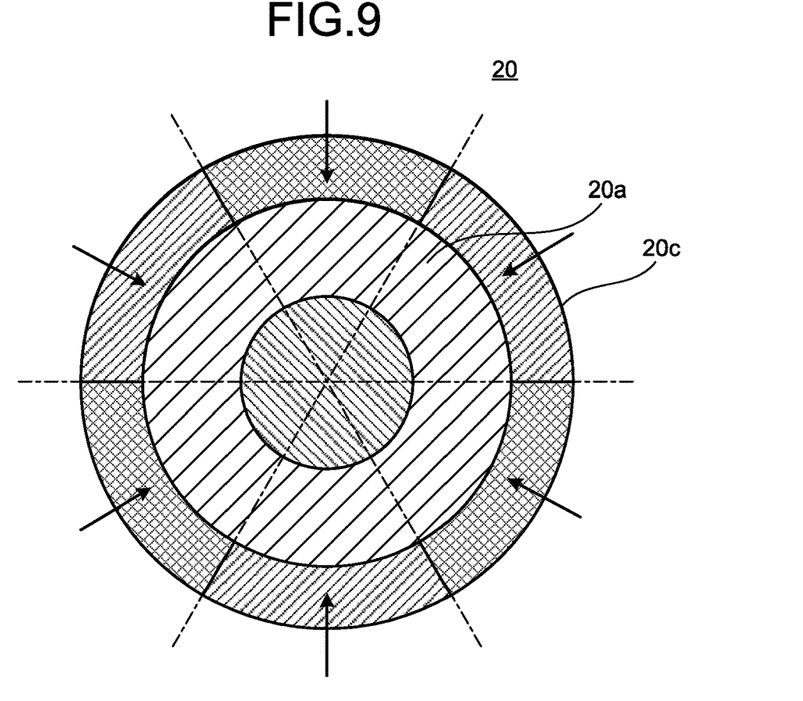
FIG. 9 is a sectional view of a surface-magnet rotor.

FIG. 5 is a chart illustrating rates of copper losses of a copper wire and an aluminum wire, FIG. 6 is a chart illustrating relations between the magnet temperature and the coercive force, FIG. 7 is a chart illustrating specific heats of the ferrite magnet and the rotor core, FIG. 8 is an illustration representing heat transmitted to inside of the rotor core, and FIG. 9 is a sectional view of a surface-magnet rotor.

As illustrated in FIG. 5, assuming that the copper loss of a copper wire is 100%, the copper loss of an aluminum wire reaches 160% that is 1.6 times that of the copper wire. Therefore, when a winding wire to be wound around the stator 1 is changed from a copper wire to an aluminum wire, heat corresponding to a difference in copper loss between the copper wire and the aluminum wire is generated in the stator 1 illustrated in FIG. 2.

Meanwhile, the temperature coefficient of coercive force of the ferrite magnets 2c is positive while the temperature coefficient of coercive force of a rare-earth magnet is negative as illustrated in FIG. 6. That is, the ferrite magnets 2c have characteristics that the coercive force increases with increases in magnet temperature. Because the resistance to a demagnetizing field is increased and the reliability is enhanced when the coercive force increases, it is desirable that the coercive force is higher.

A material having a lower specific heat than that of the ferrite magnets 2c is used for the embedded-magnet rotor core 2a as illustrated in FIG. 7. When a material having a lower specific heat is used for the embedded-magnet rotor core 2a, heat generated by the aluminum winding wire 6 can be transmitted to the ferrite magnets 2c more effectively than a surface-magnet rotor core 20a illustrated in FIG. 9.

This matter is described specifically. When a surface-magnet rotor 20 illustrated in FIG. 9 is set in the stator 1 illustrated in FIG. 2, heat transmitted from the teeth 5b transmits toward inside of the magnets 20c gradually from outer circumferential surfaces on a radially outer side of the magnets 20c arranged on an outer circumferential surface of the rotor core 20a in the rotor 20. That is, because the heat from the teeth 5b transmits only to the outer circumferential surfaces of the magnets 20c in the rotor 20, the heat is not easily transmitted to a radially inner side of the magnets 20c.

A number of arrows "a" and "b" in FIG. 8 schematically show paths of heat transmitted to the rotor core 2a. First, in FIG. 2, heat generated by the aluminum winding wire 6 transmits to the rotor core 2a via the facing surfaces 5e of the tooth end portions 5b2, the clearance 8, and the outer circumferential surface of the rotor core 2a in this order. Heat denoted by the arrows "a" in FIG. 8 of the heat transmitting to the rotor core 2a transmits to the ferrite magnets 2c from portions on a radially outer side of the corresponding magnet insertion holes 2b. On the other hand, heat denoted by the arrows "b" of the heat transmitting to the rotor core 2a passes through between adjacent ones of the magnet insertion holes 2b and transmits to the ferrite magnet 2c via portions on a radially inner side of the magnet insertion holes 2b.

In this manner, when a material having a lower specific heat than that of the ferrite magnets 2c is used in the embedded-magnet rotor core 2a, heat generated by the aluminum winding wire 6 can transmit to both the radially outer side and the radially inner side of the ferrite magnets 2c. That is, while heat transmits only to the outer circumferential surfaces on the radially outer side of the magnets 20c in the surface-magnet rotor core 20a, heat can be transmitted to the entire outer circumferential surfaces of the ferrite magnets 2c in the embedded-magnet rotor core 2a. Therefore, the rotor 2 can increase the magnet temperature more effectively than the rotor 20 and accordingly the coercive force is enhanced in the rotor 2 with increase in the magnet temperature, thereby to improve the demagnetization resistance.

Because the degree of adhesion between the aluminum winding wire 6 and the stator core 5 is higher in the concentrated winding method, use of the concentrated winding method enables the magnetic temperature to be increased more.

A configuration for improving the demagnetization resistance by increasing the temperature of the ferrite magnets 2c has been described above. However, because the aluminum winding wire 6 has larger loss than a copper wire, there is a concern of a reduction in motor efficiency. A configuration for improving the demagnetization resistance while suppressing a reduction in motor efficiency is described below.

Figure 10:
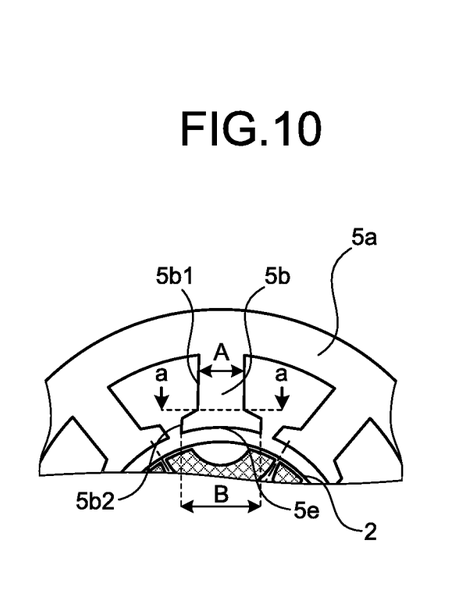
FIG. 10 is a partially enlarged view of teeth.
Figure 11:
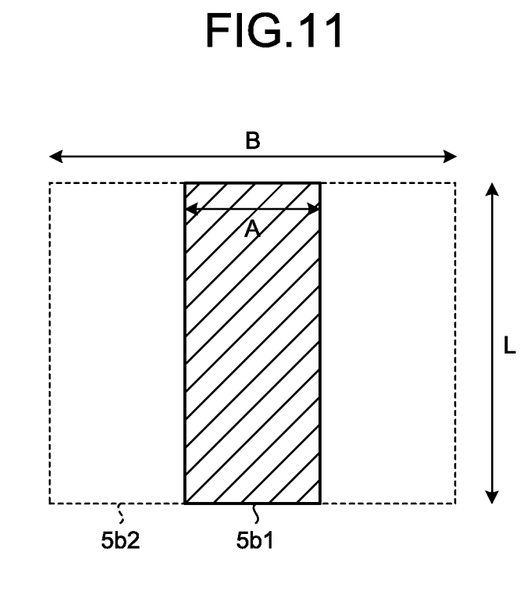
FIG. 11 is a sectional view of the teeth illustrated in FIG. 10 taken along a line in the direction by arrows a-a.

FIG. 10 is a partially enlarged view of the teeth, and FIG. 11 is a sectional view of the teeth illustrated in FIG. 10 taken along a line in the direction by arrows a-a. Because the resistance value of an aluminum wire is higher than that of a generally used copper wire as described above, it is important to shorten a winding length in one turn of the aluminum winding wire 6 to be wound around the teeth 5b.

As illustrated in FIG. 10, the tooth end portion 5b2 of the tooth 5b is formed in such a manner that a width B in the rotation direction of the facing surface 5e is larger than a width A in the rotation direction of the winding wire portion 5b1.

Because the magnetic flux from the rotor 2 enters the back yoke 5a through the tooth end portions 5b2 and the winding wire portions 5b1, designs of the tooth end portions 5b2 and the winding wire portions 5b1 are important to effectively capture the magnetic flux into the back yoke 5a.

If the width A of the winding wire portion 5b1 is too large, the cross-sectional area of the slots 5d becomes small and wire winding spaces are reduced. If a fine aluminum wire is used to ensure the number of turns of the aluminum winding wire 6, the copper loss increases and the motor efficiency deteriorates.

The solid line illustrated in FIG. 11 represents an outline of the winding wire portion 5b1 and the dotted line illustrated in FIG. 11 represents an outline of the tooth end portion 5b2 viewed from a radially outer side of the stator core 5 toward a radially inner side thereof. In FIG. 11, there are represented the width A (mm) in the rotation direction of the winding wire portion 5b1, the width B (mm) in the rotation direction of the tooth end portion 5b2, and a length in the axis direction of the stator core 5, that is, a stack thickness L (mm) of the stator core 5 are represented. In FIG. 11, stack thicknesses of the winding wire portion 5b1 and the tooth end portion 5b2 are regarded as the stack thickness L of the stator core 5.

A winding length in one turn of a winding wire that is a length per one turn of the aluminum winding wire 6 wound around the winding wire portion 5b1 can be expressed as $(A+L) \times 2$. The amount of captured magnetic flux in the axis direction is increased when the stack thickness L of the stator core 5 is increased, but the amount of captured magnetic flux does not change even when the width A of the winding wire portion 5b1 is increased. Therefore, it is desirable that the width A of the winding wire portion 5b1 is narrower.

The ratio of the winding length in one turn to the stack thickness L can be defined as $(A+L) \times 2 \div L$. Meanwhile, the number of the slots 5d needs to be designed to be adapted to the magnetic flux density of the width A of the winding wire portion 5b1. Therefore, when the number of the slots 5d is S, the number S of the slots 5d has an inverse relationship to the width A of the winding wire portion 5b1. When this relationship is introduced into the above expression, $S \times A \div L$ is obtained.

Figure 12:
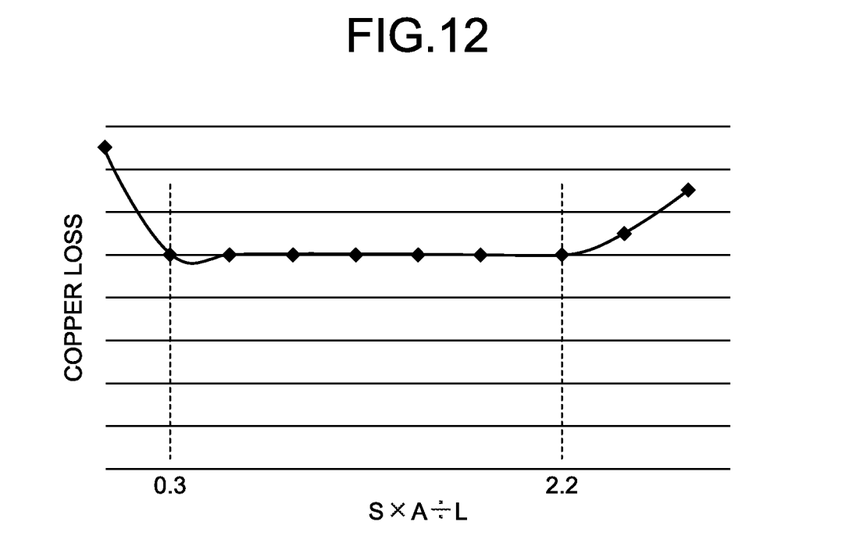
FIG. 12 is a chart illustrating a copper loss obtained by actual measurement.

FIG. 12 is a chart illustrating a copper loss obtained by actual measurement. In FIG. 12, the vertical axis represents the loss increase index and the horizontal axis represents the value obtained by S×A÷L. As illustrated in FIG. 12, when the value obtained by S×A÷L is larger than 0.3 and smaller than 2.2, that is, when the stator core 5 has a shape that satisfies a relation of 0.3<S×A÷L<2.2, a winding length in one turn effective for capturing the magnetic flux is obtained. Therefore, even when the aluminum winding wire 6 is used, wasteful copper loss is reduced, and the demagnetization resistance can be improved while a reduction in the motor efficiency is suppressed.

Second Embodiment

Figure 13:
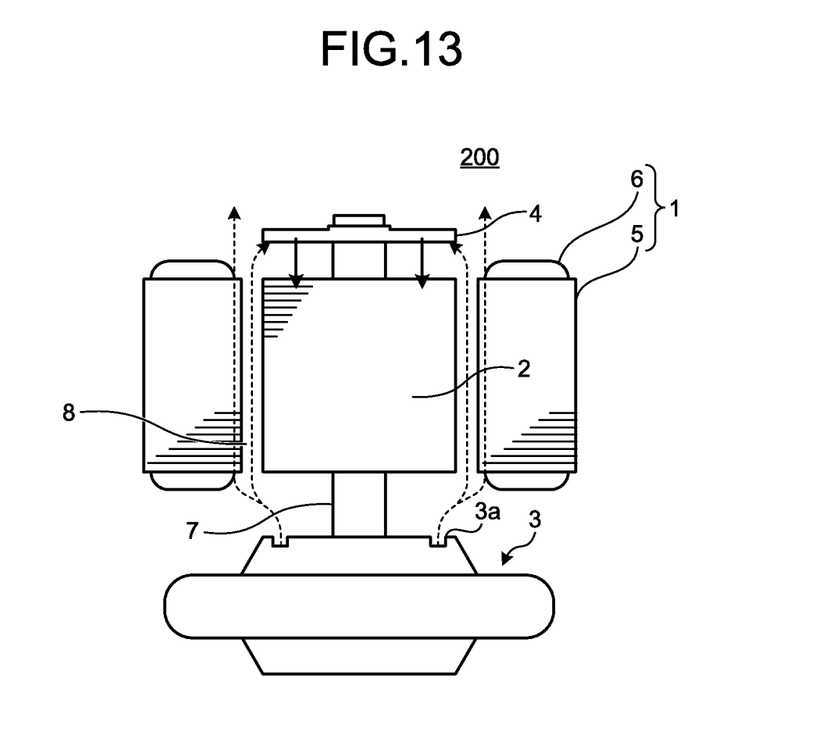
FIG. 13 is a side view of a motor of a compressor according to a second embodiment of the present invention.

FIG. 13 is a side view of a motor of a compressor according to a second embodiment of the present invention. A compressor 200 illustrated in FIG. 13 has an oil separator 4 that is installed on the shaft 7 passing through an upper surface side of the rotor core 2a and is positioned to the upper surface side of the rotor core 2a. The configuration other than the oil separator 4 is identical to that of the compressor 100 illustrated in FIG. 1. Parts identical to those of the first embodiment are denoted by like reference signs and descriptions thereof will be omitted, and only parts of the second embodiment different from those of the first embodiment are described below.

Dotted arrows illustrated in FIG. 13 represent paths of a refrigerant and misty lubricant oil, and solid arrows represent paths of lubricant oil liquefied by the oil separator 4. When the oil separator 4 illustrated in FIG. 13 is provided, the refrigerant compressed by the compression unit 3 is scraped above the compression unit 3 at the time of an operation of the compressor 200. The compressed refrigerant passes through the clearance 8 or the slots 5d and reaches a discharge pipe (not illustrated). At this time, lubricant oil accumulated below the compressor 200 is scraped above the compression unit 3 in a misty state. The misty lubricant oil absorbs heat generated by the aluminum winding wire 6 when passing through the clearance 8 or the slots 5d as illustrated by the dotted arrows, and is liquefied by the oil separator 4. The liquefied lubricant oil drops on an axial end face of the rotor 2 located below the oil separator 4 as illustrated by the solid arrows. Heat of the lubricant oil dropped on the axial end face of the rotor 2 transmits from the axial end face of the rotor 2 to the ferrite magnets 2c. As a result, the heat generated by the aluminum winding wire 6 can be transmitted more effectively to the ferrite magnets 2c and the demagnetization resistance is improved more.

Third Embodiment

Figure 14:
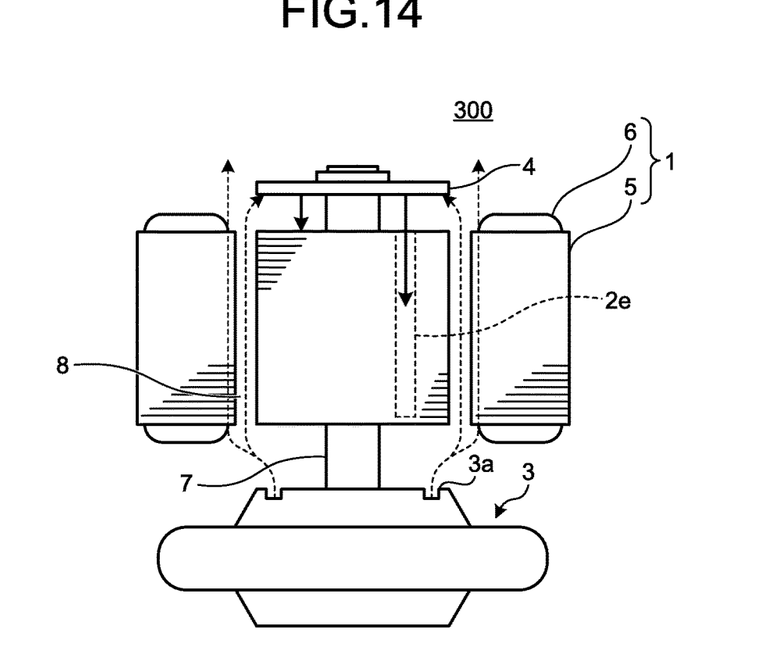
FIG. 14 is a side view of a motor of a compressor according to a third embodiment of the present invention.
Figure 15:
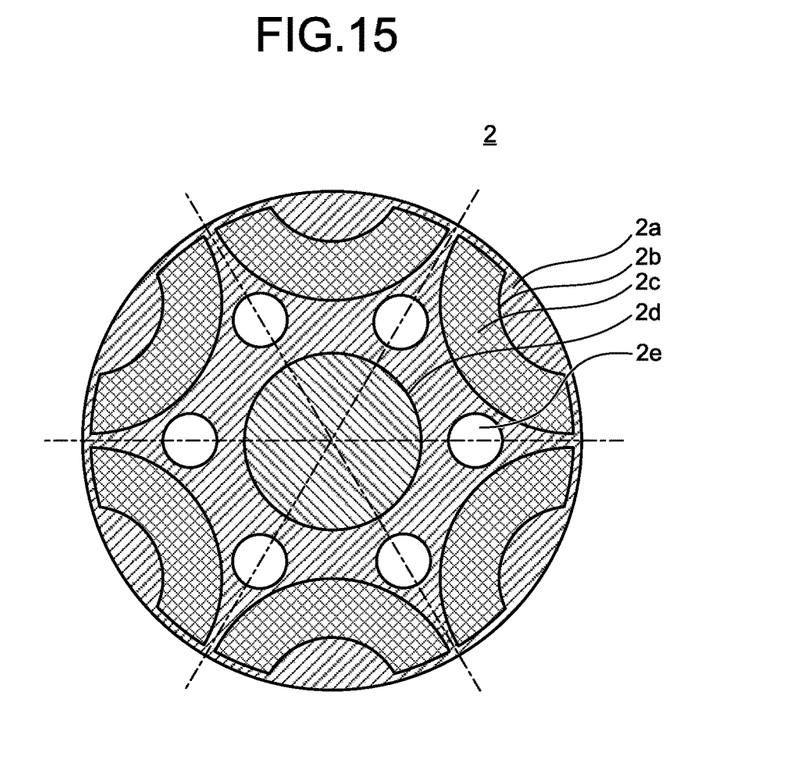
FIG. 15 is a sectional view of a rotor illustrated in FIG. 14.

FIG. 14 is a side view of a motor of a compressor according to a third embodiment of the present invention, and FIG. 15 is a sectional view of a rotor illustrated in FIG. 14. In a compressor 300 illustrated in FIG. 14, holes 2e are formed in the rotor core 2a while the oil separator 4 is used. Parts identical to those of the first embodiment are denoted by like reference signs and descriptions thereof will be omitted, and only parts of the third embodiment different from those of the first embodiment are described below.

The hole 2e is formed in a dent shape extending from a face on a side facing the oil separator 4 out of two axial end faces of the rotor core 2a toward the compression unit 3 as illustrated in FIG. 14. The holes 2e are provided at regular intervals in the rotation direction between adjacent ones of the magnet insertion holes 2b and between the magnet insertion holes 2b and the shaft insertion hole 2d, as illustrated in FIG. 15.

The lubricant oil liquefied by the oil separator 4 infiltrates into the holes 2e of the rotor core 2a located below the oil separator 4 and heat of the lubricant oil infiltrated into the holes 2e transmits to the ferrite magnets 2c from a radially inner side of the ferrite magnets 2c. As a result, the heat generated by the aluminum winding wire 6 can be transmitted more effectively to the ferrite magnets 2c and the demagnetization resistance can be improved more.

Figure 16:
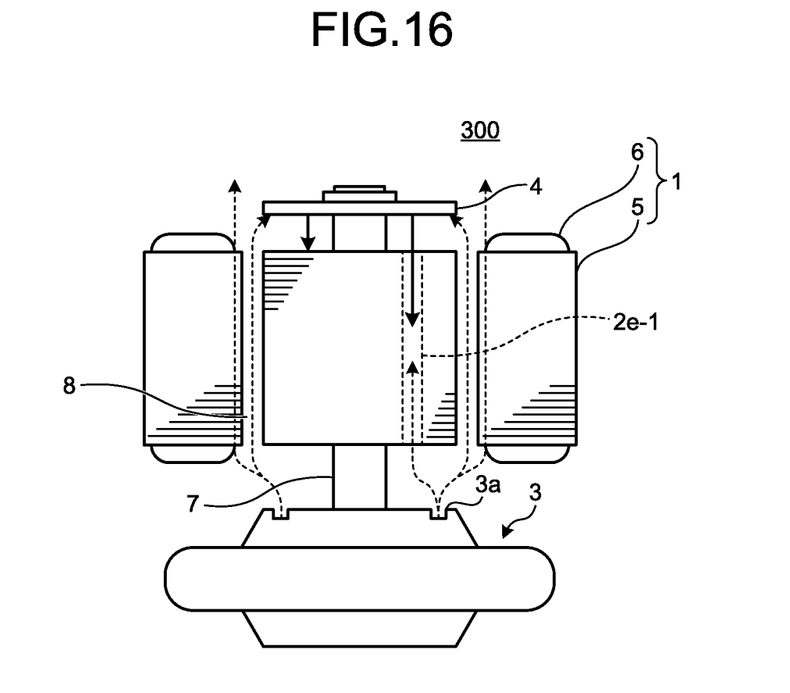
FIG. 16 is a view illustrating a modification of the rotor illustrated in FIG. 14.

FIG. 16 is a view illustrating a modification of the rotor illustrated in FIG. 14. In the compressor 300 illustrated in FIG. 16, holes 2e-1 penetrate both the axial end faces of the rotor core 2a. Due to this configuration, the lubricant oil liquefied by the oil separator 4 can be infiltrated into the holes 2e-1 from their upper side to heat the ferrite magnets 2c. Furthermore, the holes 2e-1 can also serve as flow passages of the refrigerant as shown by dotted line arrows. That is, the refrigerant infiltrated into the holes 2e-1 from their lower side passes through the holes 2e-1 toward their upper side and is discharged from a discharge pipe (not illustrated). As a result, the flow amount of the refrigerant in the compressor 300 is increased and the refrigeration capacity of the refrigeration cycle apparatus 30 can be improved.

The positions of the holes 2e and the holes 2e-1 described in the third embodiment are not limited to positions between adjacent ones of the magnet insertion holes 2b and between the magnet insertion holes 2b and the shaft insertion hole 2d. For example, a number of holes can be provided at regular intervals in the rotation direction between each of the magnet insertion holes 2b and the shaft insertion hole 2d. Also in this configuration, the heat generated by the aluminum winding wire 6 can be effectively transmitted to the ferrite magnets 2c. By mounting one of the compressors 100, 200 and 300 according to the first to third embodiments on the refrigeration cycle apparatus 30, the refrigeration cycle apparatus 30 with high efficiency and high reliability can be provided.

As described above, the compressors 100, 200 and 300 according to the first to third embodiments include the stator core 5 in which the aluminum winding wire 6 is wound around the plural teeth 5b in a concentrated manner, the rotor core 2a disposed on an inner diameter side of the stator core 5 and having the plural magnet insertion holes 2b, and the plural ferrite magnets 2c inserted into the plural magnet insertion holes 2b, in which when the width of the winding wire portions 5b1 formed in the teeth 5b is represented as A, the length in the axis direction of the stator core 5 is represented as L, and the number of the plural slots 5d is represented as S, the stator core 5 has a shape that satisfies a relation of 0.3<S×A÷L<2.2. Due to this configuration, heat generated by the aluminum winding wire 6 can be transmitted to the ferrite magnets 2c to improve the coercive force. Furthermore, because a winding length in one turn effective for capturing the magnetic flux can be obtained, wasteful copper loss is reduced even when the aluminum winding wire 6 is used, so that the demagnetization resistance can be improved while a reduction in the motor efficiency is suppressed.

Furthermore, the compressors 200 and 300 according to the second and third embodiments have the oil separator 4 installed on the shaft 7 penetrating the upper surface side of the rotor core 2a and positioned on the upper surface side of the rotor core 2a. This configuration enables heat of lubricant oil liquefied by the oil separator 4 to be transmitted to the ferrite magnets 2c, thereby effectively heating the ferrite magnets 2c.

In the rotor core 2a of the compressor 300 according to the third embodiment, the holes 2e or 2e-1 that are formed between the magnet insertion holes 2b and the shaft insertion hole 2d and open on the oil separator 4 side are formed. Due to this configuration, heat of lubricant oil liquefied by the oil separator 4 can be transmitted to the ferrite magnets 2c from the radially inner side of the ferrite magnets 2c, and the ferrite magnets 2c can be effectively heated.

Furthermore, the holes 2e-1 according to the third embodiment penetrate the both end faces of the rotor core 2a. Therefore, the flow amount of a refrigerant in the compressor 300 is increased, and the refrigeration capacity of the refrigeration cycle apparatus 30 can be improved.

The configurations described in the above embodiments are only examples of the configuration of the present invention and can be combined with other publicly known techniques, and a part of the configurations can be omitted or modified without departing from the scope of the present invention.

The invention claimed is:

1. A motor of a compressor comprising:
   a stator core including a plurality of teeth and a plurality of slots formed between the teeth, an aluminum winding wire being wound around the teeth in a concentrated manner;
   a rotor core disposed on an inner diameter side of the stator core and including a plurality of magnet insertion holes; and
   a plurality of ferrite magnets inserted into the magnet insertion holes, wherein
   when a width of a winding wire portion formed in each of the teeth is represented as A, a length in an axis direction of the stator core is represented as L, and the number of the slots is represented as S, the stator core has a shape that satisfies a relation of $0.3 < S \times A \div L < 2.2$, and
   each of the plurality of magnet insertion holes has a curved shape that curves toward a radially inner side.

2. The motor of a compressor according to claim 1, wherein a material having a lower specific heat than that of the ferrite magnets is used for the rotor core.

3. A refrigeration cycle apparatus comprising the compressor according to claim 1.

4. A motor of a compressor comprising:
   a stator core including a plurality of teeth and a plurality of slots formed between the teeth, an aluminum winding wire being wound around the teeth in a concentrated manner;
   a rotor core disposed on an inner diameter side of the stator core and including a plurality of magnet insertion holes;
   a plurality of ferrite magnets inserted into the magnet insertion holes; and
   an oil separator installed on a shaft penetrating an upper surface side of the rotor core and positioned on an upper surface side of the rotor core,
   wherein when a width of a winding wire portion formed in each of the teeth is represented as A, a length in an axis direction of the stator core is represented as L, and the number of the slots is represented as S, the stator core has a shape that satisfies a relation of $0.3 < S \times A \div L < 2.2$,
   in the rotor core, holes that are formed between the magnetic insertion holes and a shaft insertion hole and each have an opening to the oil separator side are formed, and
   each of the plurality of magnet insertion holes has a curved shape that curves toward a radially inner side.

5. The motor of a compressor according to claim 4, wherein a material having a lower specific heat than that of the ferrite magnets is used for the rotor core.

6. The motor of a compressor according to claim 4, wherein the holes penetrate both end faces of the rotor core.

7. A refrigeration cycle apparatus comprising the compressor according to claim 4.

* * * * *